Dec. 26, 1939.  R. CHILTON  2,184,734
ROCKING DYNAMIC DAMPER
Filed Sept. 21, 1935  4 Sheets-Sheet 4
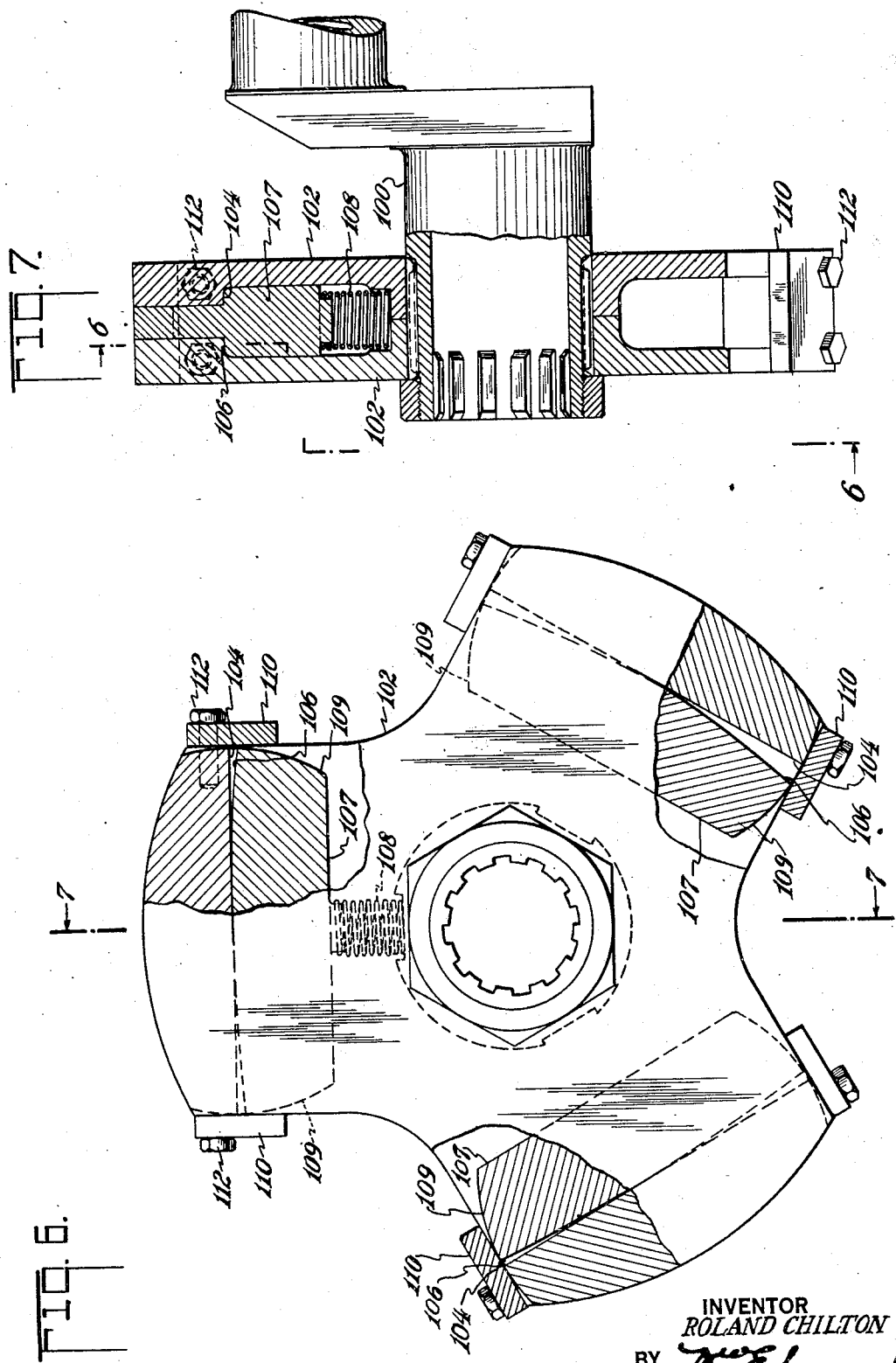
INVENTOR
ROLAND CHILTON
BY
ATTORNEY Patented Dec. 26, 1939

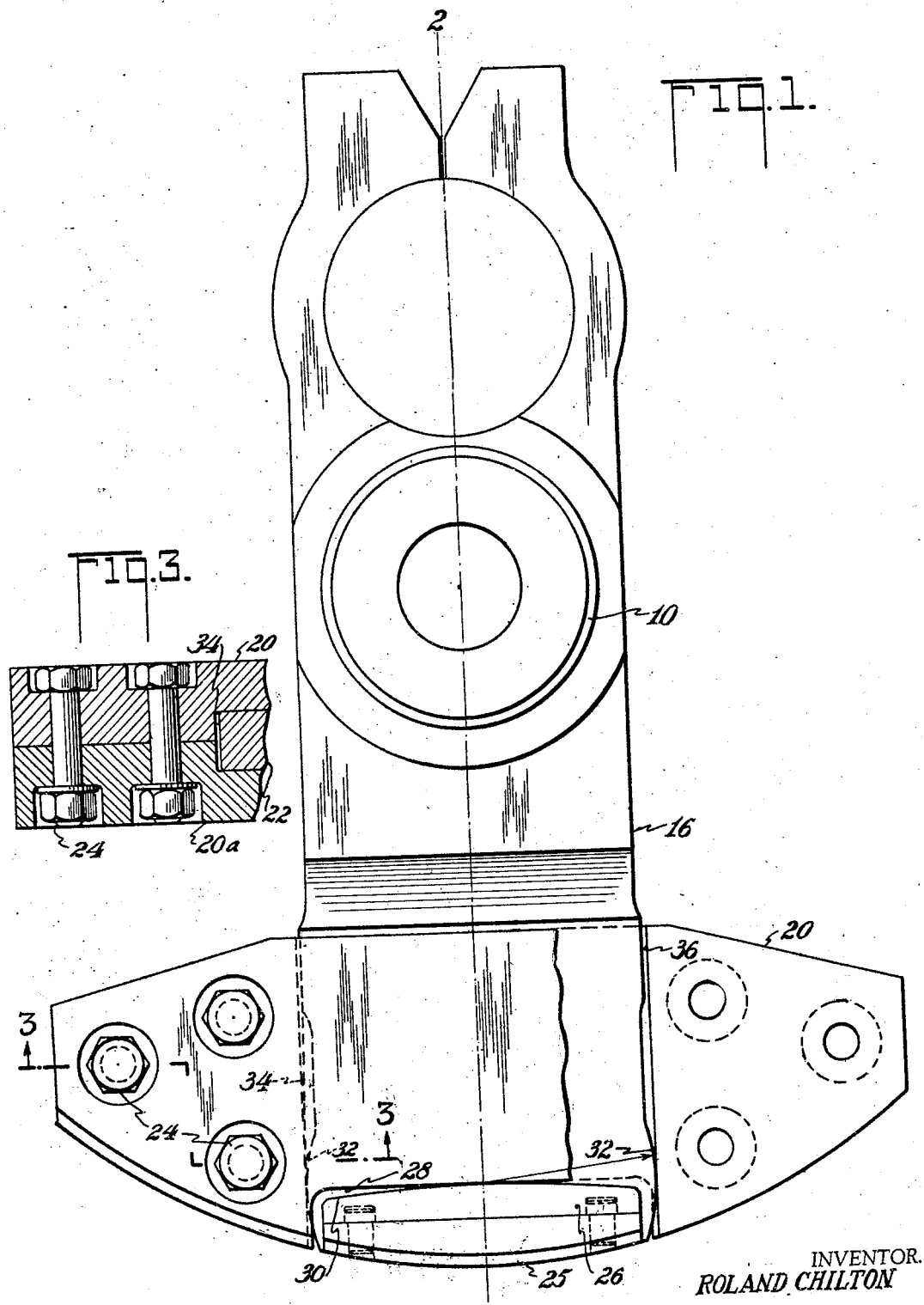

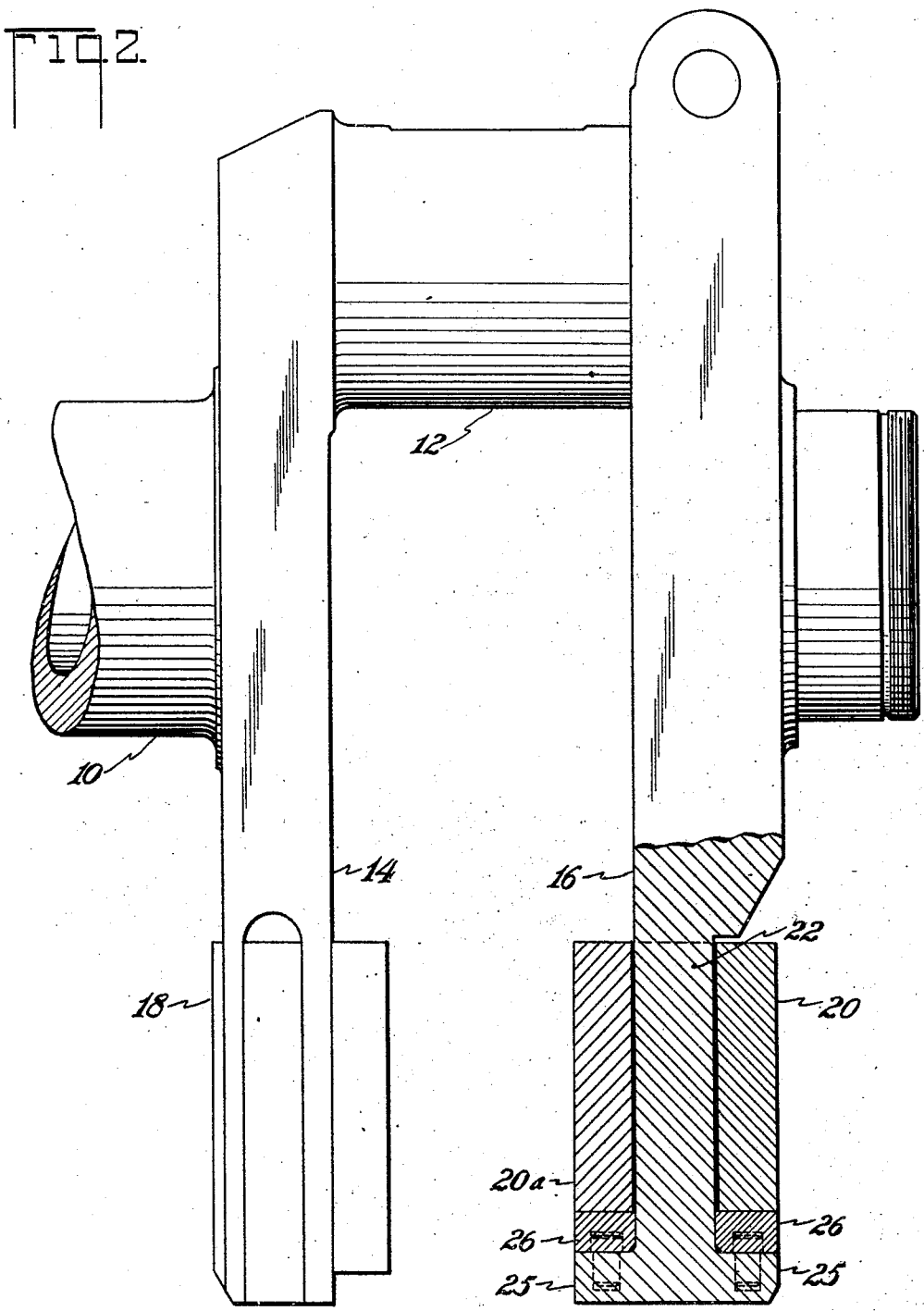

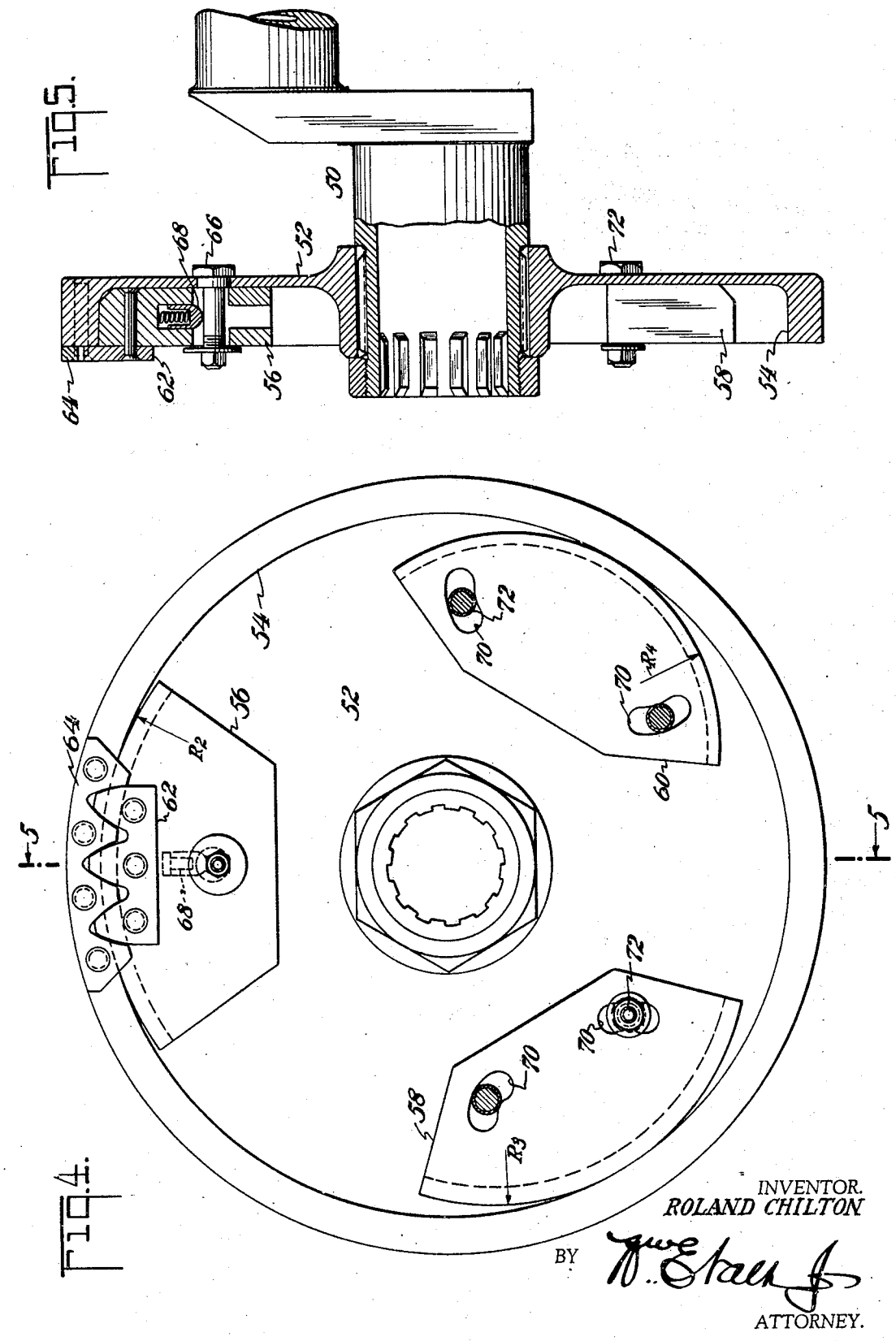

2,184,734

UNITED STATES PATENT OFFICE 2,184,734

ROCKING DYNAMIC DAMPER

Roland Chilton, Ridgewood, N. J., assignor, by mesne assignments, to Wright Aeronautical Corporation, Paterson, N. J., a corporation of New York Application September 21, 1935, Serial No. 41,541

13 Claims. (Cl. 74—604)

This invention relates to new and improved means for equalizing torque variations in shaft systems and to the suppression of torsional vibrations in engine crankshafts in particular. In certain aspects the invention comprises improvements on my co-pending application, Serial No. 7,475, filed February 21, 1935.

In that application there is shown a novel roller suspension means whereby a relatively large mass is suspended to comprise a pendulum of relatively high frequency. The structure therein disclosed has gone into extended and successful use in aircraft engines and has been shown to reduce torsional vibrations to insignificant amplitudes. This device, and the one herein disclosed, function according to the known principle that, if a pendulous mass be freely supported on a rotating shaft system, so as to have a pendulum frequency equal to the frequency of the torque variations impressed upon the shaft, then the mass will automatically swing in such phase as to apply forces equal and opposite to the impressed torque variations, whereby the net torque on the entire system is reduced to a virtually constant quantity.

The invention may be applied to a counterweight of a radial engine. Such counterweights have relatively great mass and polar moment whereby the maximum frequency obtainable as a conventional compound pendulum having a single pivot point is much too slow to obtain synchronism with the engine impulses and a prime object of the present invention is to provide an improved suspension system whereby a mass of great polar moment of inertia may be endowed with any desired frequency.

It is known that, when a mass is pendulously attached to a rotating body so as to be stabilized by centrifugal force, then the period of vibration of the mass increases with the rotational speed so that the mass makes the same number of vibrations per revolution at all engine speeds. In the case of a nine-cylinder radial aircraft engine, for example, the disturbing impulses occur four and a half times per revolution and a mass having this pendulum frequency is desired. I have discovered that, by supporting the mass for rocking action along faces having the appropriate convexity relation, very high frequencies may be obtained even though the mass has a large polar moment. By choosing a suitable radius for the rocker face any frequency within the range needed on conventional engines may be obtained including even a frequency of one swing per revolution which is not obtainable with the structure of my copending application above referred to.

In one known form of device the dynamic pendulum masses comprise cylindrical members adapted to roll in circular holes formed in an appropriate crankshaft extension, but in attempting to apply this device to radial aircraft engines, for example, it is found that only a very small proportion of the normal counterweight mass can be realized in the dynamic rollers, since a much greater proportion of the mass is absorbed in supplying the inactive supporting structure. Such small masses are apt to develop excessive angles of swing in their attempt to generate sufficient balancing torque and it is known that at large angles of swing the normal frequency is upset. Further, at large angles of swing, the forces generated cause these rollers to slide instead of roll against the contacted surface, which again causes variations in frequency and loss of the synchronism on which the theory of the device is based.

In the novel construction of this invention very small angles of swing are adequate to produce relatively great balancing torque reactions, because of the rapid contact shift associated with the large radius rocker face which is appropriate to give the frequencies desired in practice. From this it results that the forces acting to cause sliding of the rocker faces are very small compared to the centrifugal contacting forces by which this sliding is resisted. Accordingly, with the provisions of this invention pure rolling action is automatically obtained throughout the small required angle of swing so that there is no departure from the theoretical frequency.

In the drawings:

Fig. 1 is an axial end view of a crankshaft embodying the device;

Fig. 2 is a side view in part section on the line 2—2 of Fig. 1;

Fig. 3 is a part section on the line 3—3 of Fig. 1;

Fig. 4 is an end view of an alternative embodiment suited to in-line engines;

Fig. 5 is a part axial section on the line 5—5 of Fig. 4;

Fig. 6 is an end view, in part section on the line 6—6 of Fig. 7, of a further alternative; and Fig. 7 is a part axial section on the line 7—7 of Fig. 6.

In these figures there is shown a radial engine crankshaft having journal portions 10, a crankpin 12, and extended crank cheeks 14—16. To the cheek 14 there is secured a conventional counterweight 18 by the usual rigid attaching means. The rear counterweight 20, however, is rockably mounted on the rear cheek 16 and comprises a dynamic counterweight according to the provisions of the invention. The counterweight comprises two halves, 20 and 20a, embracing the extension 22 of the crank cheek 16, the two halves being secured together by bolts 24, the whole being free for limited rocking action in the plane of Fig. 1. The extension 22 is provided with side abutments 25 against which are seated hardened rocker plates 26 which the counterweight 20, 20a rockably abuts, as will be clear from Fig. 1, wherein the counterweight has been shown with a straight face 28 and the crankshaft plates with a convex coacting profile 30 to comprise the rocker joint. It is to be understood that the crowned face might be applied to the weight and the straight surface to the crankshaft 26 or alternatively, both these members might have curved surfaces of the relation appropriate to the desired frequency.

Referring to Figs. 1 and 3, it will be seen that the crank extension 22 has arcuate profiles 32 to which the internal surfaces 34 of the counterweight are fitted to locate the latter against endwise motion, while a suitable clearance is provided at 36 to prevent excessive rocking motion of the weight as when the engine is started up or subject to back-firing or other erratic impulses.

In operation the angle of swing of the counterweight depends upon its mass and radius of gyration in relation to magnitude of the torque variations to which the shaft is subject, and with the proportion shown, the angle of swing will be only a few degrees. For the specific nine-cylinder engine crankshaft illustrated the required radius of the rocker face 30 is of the order of one hundred inches to give four and a half swings per revolution. It will be obvious that this large radius results in correspondingly rapid shift of the rocking contact point toward the ends of the face 30 in response to a relatively small angular displacement of the weight. It will be seen that the maximum balancing torque exerted on the shaft by the weight will be in proportion to the centrifugal force of the weight and the distance to which the contact point moves from the center line 2, 2. Thus, if we assume the crankshaft, while rotating, to be suddenly accelerated in a clockwise direction through one degree, it will be obvious that, due to its large polar moment, the counterweight will not immediately follow this displacement, whereby the relative motion between the faces 30 and 28 will rock their contact point leftwardly, whereupon the centrifugal force of the weight will act at a point offset from the line 2—2 producing a counter-clockwise turning moment on the shaft. If the radius of the face 30 be appropriately chosen to bring the frequency of the weight into synchronism with the exciting impulses on the shaft, the weight will automatically swing so that the balancing torque is 180° out of phase with the exciting impulses.

The frequency of a mass comprising a rocker subject to centrifugal force varies as the square root of the radius from the center of rotation to the center of gravity of the mass and inversely as the radius of gyration of the mass. In the case where the center of gravity is not on the rocker face, a further factor A in the following formula is introduced:

$$\text{Swings per revolution} = \frac{f}{n} = \sqrt{\frac{L(R-A)}{R^2_s + A^2}}$$

L = Radius to center of gravity mass.
R = Radius of rocker face.
A = Distance from rocker face to center of gravity.
$R_g$ = Radius of gyration.

This covers the specific case where one of the rocker faces is a straight line, but similar convexity relationship and frequency may obviously be obtained by curving both rocker faces to appropriately different radii. The above formula has been found to be in good agreement with frequency measurements on actual rocking masses for small amplitudes of swing, and it is included here in the interests of complete disclosure, and not to limit the invention to any specific method of ascertaining the appropriate rocker proportions.

In the case of multi-cylinder engines, the radius for the rocker face necessary to give the required high frequencies of vibration is large relative to the dimensions of the pendulum mass and for the usual cases where a multiplicity of swings per revolution are desired, the center of curvature of the rocker face will fall outside of the outline of the mass, in contradistinction to the "roller-in-the-hole" disposition of the prior art.

In the case of in-line engines having long crankshafts with a number of spaced crankpin masses, the crankshaft system may have more than one frequency of synchronous vibration and in that case, masses of correspondingly various frequencies may be conveniently used according to an alternate embodiment of this invention, as illustrated in Figs. 4 and 5.

Referring now to the alternative embodiment of Figs. 4 and 5, 50 designates a conventional in-line engine crankshaft to which is splined a carrier member 52 having a circular rim 54 against which are rockably engaged masses 56, 58 and 60 having various radii $R_2$, $R_3$, $R_4$ of rocker engagement with the circular rim 54. These radii are so chosen with respect to the polar moment and radius to the center of gravity of the masses as to give each a pendulum frequency synchronous with the frequency of one of the torsional vibrations which it is desired to eliminate.

Alternative methods of locating the masses against circumferential movement are shown. In case of the upper weight 56, mating gear tooth elements 62 and 64 secured respectively to the ring member 54 and the mass are shown. The mass may be additionally located by a stud 66 against which is engaged a spring loaded plunger 68 by which the weight is urged into initial contact with the rim 54.

In case of masses, such as 58 and 60, having a slower period and, accordingly, a more acute radius relation; appropriately curved slots 70 may cooperate with studs 72, locating the masses for rocking contact with the rim 54 and against circumferential displacement. It will be clear that various periodicities of the masses are secured by the appropriate relation of the rocking radii $R_2$, $R_3$, $R_4$, one being made synchronous with each torsional period to which the particular shaft is subject in operation.

A modified form of multiple pendulous weight is shown in Figs. 6 and 7 wherein 100 designates a crankshaft to which are splined similar opposed carrier members 102 having inwardly facing abutments 104 against which are rockably engaged cooperating abutments 106 of the rocker masses 107. Light springs 108 may be provided to maintain initial contact at the rocking faces while the shaft is stationary. Circumferential movement of the weights is prevented by end profiles 109 which are engaged by retaining plates 110 suitably secured as by screws 112. To conserve space, the abutments 106 are intermediate the radial dimension of the masses 107, so that the outer edges of the masses and carrier members 102 are substantially coextensive, as shown in Fig. 7.

In the case of the radial engine embodiment of Figs. 1 to 3, the single counterweights and the crankshaft extensions are made of sufficient mass to counterbalance the crankpin 12 and its associated masses as usual in radial engines. In case of the in-line engine embodiments, Figs. 4 to 7, inclusive, the appropriate number of rocking weights will be evenly spaced circumferentially and their masses made equal to maintain rotational balance, but the method of operation of each weight in damping out the vibration period to which it is synchronous is the same in all cases.

In the design of a rocking damper of the type disclosed, forces act on the mass, (1) as a result of angular acceleration of the shaft, whereby the weight lags rotationally due to its polar moment of inertia, and (2) as a result of acceleration of the mass in its circumferential path; the movement of the mass in response to this latter force alone is dependent upon the position of the rocking contact faces with respect to the center of gravity of the mass.

As shown, the rocking faces are radially beyond the mass center of gravity, in which condition the forces due to the (2) mentioned above tend to turn the mass in the same direction as shaft rotation. However, said latter force is of less magnitude than that due to (1) above, whereby the resultant forces acting upon the mass due to shaft acceleration tends to move the weight in a lagging direction as desired, to offset torsional impulses on the shaft.

If the rocking contact faces are positioned on the shaft center side of the mass center of gravity, both the forces due to (1) and (2) above, will act accumulatively to cause lagging movement of the mass relative to the shaft. An arrangement such as the latter mentioned would probably be a preferred physical arrangement, but it is to be noted that the device functions in the manner desired with either location of the rocking faces relative to the center of gravity of the mass.

One exception to the above should be here mentioned; if the rocking contact faces are located at the center of percussion of the mass, the forces due to the first and second cases above mentioned will be equal and opposite, whereupon the mass will neither lag nor gain relative to the shaft when rotational acceleration is imposed thereon. Such a location for rocking contact forces should be avoided, since no dynamic effect will be produced on the mass when torsional impulses are imposed thereon.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with a crankshaft extension member and a counterweight member, one embracing the other for limited relative movement, of projections extending in a longitudinal direction from and rigid with the embraced member against which said embracing member abuts, and relatively convex tracks directly engaged one with the other for rolling rocking contact carried by the projections and embracing member forming the abutments therebetween.

2. The combination with a crankshaft extension member and a counterweight member, one embracing the other for limited relative movement, said members being provided with relatively rollable rockably contacting faces directly engaged one with the other and respectively fixed to the members, resisting relative sliding of said faces, and resisting centrifugal displacement of the weight.

3. The combination with a crankshaft subject to a given number of torsional impulses per revolution, of an extension member thereon and a counterweight member, one member embracing the other, the members having relatively convex rockably engaged faces rigid with the respective members in rolling contact with one another and axially parallel to the shaft, said faces being of such difference in curvature as to endow the counterweight member with a frequency of oscillation in a plane normal to the shaft axis which is similar to the number of torsional impulses per revolution, the mean center of curvature of said rockably engaged faces being exterior to the confines of the counterweight member.

4. The combination with a crankshaft having an extended arm and an inwardly facing abutment thereon, of a counterweight having a face engaging said abutment for rocking contact shift therealong, said abutment and face being relatively convex, said counterweight having end portions extending circumferentially and radially relative to said rocking faces, and the curvature of said abutment and face being determined by a mean arc whose center lies without the confines of the counterweight.

5. The combination with a crankshaft extension of an inwardly facing abutment thereon having a substantially plane face, and a counterweight having a convex arcuate face in rocking contact with said abutment whereby slight polar movement of said counterweight moves the point of contact of said arcuate face with said plane face a substantial distance along the latter.

6. The combination with a crankshaft extension having an inwardly facing abutment of nearly plane profile, of a weight having an outwardly facing face of nearly plane profile engaging said abutment, said face and abutment, although nearly flat, being slightly relatively convex, said relative convexity being proportioned to effect a large travel of the contact point of said face and abutment relative to the amount of polar movement of said weight.

7. The combination with a crankshaft and a balancing mass member, of cooperating relatively convex arcuate rocker faces formed on and rigid with the respective members and having their respective axes parallel to the crankshaft axis, the centers of curvature of said rocker faces being without the confines of the mass member.

8. The combination with a crankshaft and a balancing mass therefor, of means connecting the shaft and mass comprising relatively convex rockably engaged faces in rolling contact, on each member, the crankshaft face having a radius greater than the largest dimension of said mass and the axes of said convex faces being parallel to the crankshaft axis.

9. In combination, a crankshaft member, a counterweight member, one embracing the other, tracks carried by the respective members having rockably contacted faces rigid with the respective members, said faces being differentially arcuate, the arcs thereof being struck from centers radially beyond the counterweight member relative to the rotation center of the crankshaft.

10. In combination with a crankshaft member and a counterweight member, one slotted to embrace the other, of means rigid with said slotted member, and means rigidly carried by the other member, said two means having faces of different radii rockably contacted with one another.

11. In combination, a crankshaft member, a counterweight member, one slotted to embrace the other, and tracks rigidly carried by respective members and rockably engaged with each other.

12. In combination, a crankshaft member, a counterweight mass, said member and mass having relatively convex surfaces contacted for rocking action, and supporting said mass against the action of centrifugal force, and means comprising auxiliary contacting surfaces on the mass and member profiled to inhibit relative sliding in planes normal to the shaft axis between said rockably contacted faces.

13. In combination, a crankshaft member and a counterweight mass, said mass and member having relatively convex surfaces contacted for rocking action and supporting said mass against centrifugal force, and means to limit said action to rocking without sliding in planes normal to the shaft axis.

ROLAND CHILTON.